United States Patent
Dextreit et al.

(10) Patent No.: US 10,054,065 B2
(45) Date of Patent: Aug. 21, 2018

(54) MOTOR VEHICLE AND METHOD OF CONTROL OF A MOTOR VEHICLE

(71) Applicant: JAGUAR LAND ROVER LIMITED, Warwickshire (GB)

(72) Inventors: Clement Dextreit, Coventry (GB); Yiannis Eftychiou, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 41 days.

(21) Appl. No.: 14/374,689

(22) PCT Filed: Jan. 24, 2013

(86) PCT No.: PCT/EP2013/051345
§ 371 (c)(1),
(2) Date: Jul. 25, 2014

(87) PCT Pub. No.: WO2013/110708
PCT Pub. Date: Aug. 1, 2013

(65) Prior Publication Data
US 2015/0006064 A1    Jan. 1, 2015

(30) Foreign Application Priority Data

Jan. 25, 2012 (GB) .................................. 1201222.5

(51) Int. Cl.
*F02D 28/00* (2006.01)
*F02D 35/00* (2006.01)
(Continued)

(52) U.S. Cl.
CPC ............. *F02D 28/00* (2013.01); *F02D 17/04* (2013.01); *F02D 29/02* (2013.01); *F02D 35/00* (2013.01);
(Continued)

(58) Field of Classification Search
CPC ......... B60W 2540/28; B60W 2540/30; B60W 30/182; B60W 40/09; B60W 40/109;
(Continued)

(56) References Cited

U.S. PATENT DOCUMENTS 5,390,117 A * 2/1995 Graf .................... F16H 61/0213
477/125
5,557,521 A * 9/1996 Danz ................... F16H 61/0213
477/43
(Continued)

FOREIGN PATENT DOCUMENTS

CN     1796747 A     7/2006
CN   101260837 A     9/2008
(Continued)

OTHER PUBLICATIONS

Combined Search and Examination Report for Application No. GB1201222.5 dated May 25, 2012.
(Continued)

*Primary Examiner* — John Zaleskas
(74) *Attorney, Agent, or Firm* — Carlson, Gaskey & Olds (57) ABSTRACT

In one aspect of the invention there is provided a motor vehicle comprising an engine, the vehicle being operable automatically to stop the engine responsive to a determination that the engine is not required to provide torque to drive the vehicle, wherein the vehicle comprises control means operable to monitor a value of one or more parameters associated with the vehicle during a drive cycle, the control means being arranged automatically to determine whether a current driving style of a driver corresponds to an economy-oriented driving style or a performance-oriented driving style responsive to the value of the one or more parameters over time during the drive cycle, the control means being operable to over-ride stopping of the engine when it is
(Continued)

determined that the driving style of the driver corresponds to a performance-oriented style.

19 Claims, 6 Drawing Sheets

(51) Int. Cl.
| | |
|---|---|
| *F02N 11/08* | (2006.01) |
| *F02D 17/04* | (2006.01) |
| *F02D 29/02* | (2006.01) |
| *B60W 40/09* | (2012.01) |
| *B60W 10/06* | (2006.01) |
| *B60W 50/00* | (2006.01) |

(52) U.S. Cl.
CPC ......... *F02N 11/0822* (2013.01); *B60W 10/06* (2013.01); *B60W 40/09* (2013.01); *B60W 2050/0089* (2013.01); *B60W 2540/30* (2013.01); *F02N 2200/105* (2013.01); *Y02T 10/48* (2013.01)

(58) Field of Classification Search
CPC ..... B60W 2520/125; B60W 2050/0089; F02D 35/00; F02D 17/04; F01N 11/0814; F01N 11/0818; F01N 11/0822; Y02T 10/48
USPC .......................................... 701/112; 123/179.4
See application file for complete search history.

(56) References Cited

U.S. PATENT DOCUMENTS

| | | | | |
|---|---|---|---|---|
| 5,954,777 | A * | 9/1999 | Cao | F16H 61/0213 477/43 |
| 6,006,151 | A * | 12/1999 | Graf | F16H 61/0213 701/57 |
| 6,086,506 | A * | 7/2000 | Petersmann | F16H 61/0213 477/45 |
| 6,233,515 | B1 * | 5/2001 | Engelman | B60K 31/0008 180/169 |
| 6,278,911 | B1 * | 8/2001 | Gimmler | B60R 16/0236 701/1 |
| 6,311,114 | B1 * | 10/2001 | Graf | F16H 61/0213 701/51 |
| 6,371,889 | B1 * | 4/2002 | Kuroda | B60K 6/485 477/167 |
| 6,450,919 | B2 * | 9/2002 | Kusafuka | F16H 61/0213 477/115 |
| 6,504,259 | B1 * | 1/2003 | Kuroda | B60K 6/46 180/65.25 |
| 6,529,813 | B1 * | 3/2003 | Henneken | F16H 61/0213 477/175 |
| 6,532,926 | B1 * | 3/2003 | Kuroda | B60H 1/00778 123/179.4 |
| 6,553,301 | B1 * | 4/2003 | Chhaya | B60K 6/54 701/54 |
| 7,069,132 | B2 * | 6/2006 | Henneken | F16H 61/0213 477/110 |
| 7,079,940 | B2 | 7/2006 | Scholt et al. | |
| 7,099,768 | B2 * | 8/2006 | Moriya | B60K 6/48 123/179.4 |
| 7,565,230 | B2 * | 7/2009 | Gardner | G09B 9/052 180/272 |
| 8,352,146 | B2 * | 1/2013 | Doering | B60W 30/16 701/96 |
| 2005/0143901 | A1 * | 6/2005 | Scholt | F02N 11/0818 701/112 |
| 2006/0009325 | A1 | 1/2006 | Ohtake et al. | |
| 2006/0224279 | A1 * | 10/2006 | Mori | F02N 11/0833 701/1 |
| 2007/0107455 | A1 * | 5/2007 | Deiml | B60H 1/00735 62/323.1 |
| 2010/0106390 | A1 * | 4/2010 | Yamaguchi | B60W 10/08 701/102 |
| 2010/0209891 | A1 * | 8/2010 | Lin | G09B 19/167 434/66 |
| 2010/0211270 | A1 * | 8/2010 | Chin | B62D 6/007 701/44 |
| 2010/0305805 | A1 * | 12/2010 | Yamaguchi | F02N 11/0822 701/31.4 |
| 2010/0312426 | A1 * | 12/2010 | Philipp | B60K 28/04 701/22 |
| 2011/0082624 | A1 * | 4/2011 | Yamamoto | F02D 29/02 701/41 |
| 2011/0112740 | A1 * | 5/2011 | Hashimoto | F02D 17/02 701/70 |
| 2012/0016573 | A1 * | 1/2012 | Ellis | B60K 31/0008 701/112 |
| 2012/0029743 | A1 * | 2/2012 | Jeon | B60W 10/06 701/22 |
| 2012/0080001 | A1 * | 4/2012 | Saito | F02N 11/0822 123/179.4 |
| 2012/0179357 | A1 * | 7/2012 | Phillips | F02D 17/02 701/112 |
| 2014/0350789 | A1 * | 11/2014 | Anker | B62D 15/025 701/41 |
| 2015/0151766 | A1 * | 6/2015 | Bureau | B60W 50/082 701/37 |
| 2015/0233336 | A1 * | 8/2015 | Leatherland | F02N 11/0833 180/271 |
| 2015/0291152 | A1 * | 10/2015 | Mould | B60W 20/1088 701/22 |

FOREIGN PATENT DOCUMENTS

| | | | |
|---|---|---|---|
| DE | 10211463 B3 | 1/2004 | |
| DE | 102004023337 A1 | 12/2005 | |
| DE | 102009026950 * | 12/2010 | ........... B60W 40/08 |
| EP | 0576703 A1 | 1/1994 | |
| EP | 0777071 A1 | 6/1997 | |
| EP | 1442921 A1 | 8/2004 | |
| EP | 2407356 A1 * | 1/2012 | ............... B60T 7/22 |
| EP | 2416001 A1 | 2/2012 | |
| GB | 2470192 A | 11/2010 | |
| JP | 2002528685 A | 9/2002 | |
| JP | 2004518073 A * | 6/2004 | |
| JP | 2011-131883 A | 7/2011 | |
| JP | 2011157857 A | 8/2011 | |
| WO | 2000/025045 A1 | 5/2000 | |
| WO | 02063163 A1 | 8/2002 | |

OTHER PUBLICATIONS

International Search Report for International application No. PCT/EP2013/051345 dated May 14, 2013.
Search Report for Chinese Application No. 201380016578.X dated May 3, 2016.

\* cited by examiner

Figure 1

FIG. 2
High Level

FIG. 3
LongA

FIG. 4
LatA

FIG. 5
KD

FIG. 6
Counter

MOTOR VEHICLE AND METHOD OF CONTROL OF A MOTOR VEHICLE

FIELD OF THE INVENTION

The present invention relates to motor vehicles operable automatically to switch off an engine of the vehicle in order to reduce an amount of fuel consumed by the vehicle and/or an amount of one or more combustion gases emitted by the vehicle. Such vehicles are commonly referred to as having 'stop/start' functionality. Aspects of the invention relate to a controller, to a method and to a vehicle.

BACKGROUND

It is known to provide a motor vehicle having stop/start functionality in which an engine of the vehicle is switched off to save fuel when conditions permit such as when the vehicle is held stationary with a driver-operated brake pedal depressed. When the driver releases the brake pedal the engine is restarted and a driveline of the vehicle is driven by the engine via a transmission.

It has been found that stop/start functionality can result in a significant decrease in an amount of undesirable gases emitted by the vehicle and a considerable saving in the amount of fuel consumed by the vehicle on a given drive-cycle. It is against this background that the present invention has been conceived.

Statement of the Invention

Aspects of the invention provide a system, a motor vehicle and a method as claimed in the appended claims.

According to another aspect of the invention for which protection is sought, there is provided a controller for a motor vehicle having an engine and an engine control system operable automatically to stop the engine in dependence on a determination that the engine is not required to provide torque to drive the vehicle, wherein the controller is configured to:
  monitor one or more parameters associated with the vehicle during a drive cycle;
  determine whether a current driving style of a driver corresponds to an economy-oriented driving style or a performance-oriented driving style in dependence on the value of the one or more parameters over time during the drive cycle; and
  to over-ride stopping of the engine by the engine control system when it is determined that the driving style of the driver corresponds to a performance-oriented style.

According to a further aspect of the invention for which protection is sought there is provided a motor vehicle comprising an engine, the vehicle being operable automatically to stop the engine responsive to a determination that the engine is not required to provide torque to drive the vehicle, wherein the vehicle comprises control means operable to monitor a value of one or more parameters associated with the vehicle during a drive cycle, the control means being arranged automatically to determine whether a current driving style of a driver corresponds to an economy-oriented driving style or a performance-oriented driving style responsive to the value of the one or more parameters over time during the drive cycle, the control means being operable to over-ride stopping of the engine when it is determined that the driving style of the driver corresponds to a performance-oriented style.

Embodiments of the present invention have the advantage that the vehicle is able automatically to adapt the functionality of the control means to the driving style of the driver. In some vehicles driver-operable means for over-riding stopping of the engine is provided, for example a 'sport' mode selector or a 'dynamic' mode selector.

Embodiments of the invention have the advantage that when the driver wishes to drive in a performance-oriented manner the driver does not need manually to over-ride the stop/start functionality. Rather, the control means detects automatically that he wishes to drive in a performance-oriented manner and over-rides stopping of the engine responsive to this determination.

It is to be further understood that if a driver has selected to over-ride the stop/start functionality he may subsequently prefer to drive in an economy-oriented manner, for example when driving in an urban environment. In vehicles not having control means according to the present invention the control means will continue to over-ride stopping of the engine until the driver deselects the dynamic mode or sport mode. Embodiments of the present invention have the advantage that the driver does not have to remember to deselect the sport mode or dynamic mode in order to allow stop/start functionality to resume. This feature has the benefit of reducing a workload on the driver. This feature also has the further benefit of reducing emissions and enhanced fuel economy since the driver may forget to deselect the sport or dynamic mode when driving in an economy-oriented driving style.

It is to be understood that because an economy-oriented driving style typically exhibits a less harsh demand for engine torque, a driver who is driving in an economy-oriented manner is unlikely to notice a drop in performance if the control means resumes stop/start functionality following a period of a more aggressive, performance-oriented driving style in which stop/start functionality was suspended. Thus, embodiments of the invention have the advantage that the control means may adapt to a driving style of a driver in a relatively seamless manner allowing improved driver enjoyment. Furthermore, embodiments of the invention have the advantage that they may reduce the risk that a vehicle experiences an unnecessary increase in emissions and fuel consumption due to driver forgetfulness in omitting to reselect (or deselect the suspension of) stop/start functionality following a period of performance-oriented driving.

Advantageously the control means may be configured to calculate a value of a driver behaviour index responsive to the driving style of the driver and to over-ride stopping of the engine responsive to the value of driver behaviour index.

In some arrangements if the value of behaviour index exceeds a prescribed value the control means over-rides stopping of the vehicle. In some alternative arrangements if the value of behaviour index is below a prescribed value the control means over-rides stopping of the vehicle.

Further advantageously the control means may be configured to change the value of the driver behaviour index towards a first value when the driver displays an economy-oriented driving style and to change the value of the driver behaviour index towards a second value when the driver displays a performance-oriented driving style.

Advantageously the control means may be configured to change the value of the driver behaviour index towards the second value responsive to a value of longitudinal acceleration of the vehicle. In addition or instead, optionally the control means may change the value of the driver behaviour index towards the second value responsive to a value of driver demanded torque.

The control means may be configured to change the value of driver behaviour index towards the second value when the value of longitudinal acceleration is more positive than an index increase positive threshold value being a positive acceleration value or is more negative than an index increase negative threshold value being a negative acceleration value.

It is to be understood that by negative acceleration is meant a deceleration of the vehicle.

The value of the index increase positive threshold value may be set to a value corresponding to relatively harsh acceleration by a driver although other arrangements are also useful.

The value of index increase negative threshold value may be set to a value corresponding to relatively harsh deceleration by a driver.

The control means may be configured to change the value of driver behaviour index towards the first value when the value of longitudinal acceleration is between an index decrease positive threshold value being a positive value and an index decrease negative threshold value being a negative value.

It is to be understood that the index decrease positive threshold value and index increase positive threshold value are different respective values in some embodiments. The index increase positive threshold value may be more positive than the index decrease positive threshold value. For values of longitudinal acceleration between these values the control means may be arranged not to change the value of driver behaviour index responsive to the value of longitudinal acceleration.

Similarly, the index increase negative threshold value and index decrease negative threshold value are different respective values in some embodiments, the index increase negative threshold value being more negative than the index decrease negative threshold value. For values of longitudinal acceleration between these values the control means may be arranged not to change the value of driver behaviour index responsive to the value of longitudinal acceleration.

The index decrease positive threshold value and index decrease negative threshold value may be set to values corresponding to relatively light acceleration and light deceleration respectively such that for values of acceleration between these values the value of driver behaviour index decreases.

Advantageously the control means may be configured to prevent the value of driver behaviour index changing responsive to the value of longitudinal acceleration responsive to a value of lateral acceleration.

Further advantageously the control means may be configured to prevent the value of driver behaviour index changing responsive to the value of longitudinal acceleration when the value of lateral acceleration exceeds a prescribed value.

This feature has the advantage that if a driver is driving aggressively but the value of longitudinal acceleration is relatively low whilst cornering, the vehicle can determine that the vehicle is cornering and take this into account when determining whether the driver behaviour index should be allowed to decrease. Thus whilst the vehicle is cornering the vehicle freezes the value of behaviour index.

The control means may be configured to change the value of the driver behaviour index responsive to one of a value of driver-demanded brake pressure and a value of driver-demanded brake torque of the vehicle.

The control means may be configured to change the value of the driver behaviour index towards the first value when the value of said one of driver demanded brake pressure and driver demanded brake torque is below a prescribed value.

Advantageously the control means may be configured to change the value of driver behaviour index responsive to at least one selected from amongst brake pedal pressure, brake pedal position, rate of change of brake pedal pressure and rate of change of brake pedal position.

The control means may be configured to change the value of the driver behaviour index responsive to at least one selected from amongst accelerator pedal position and a rate of change of accelerator pedal position.

Advantageously the control means may be configured to change the value of the driver behaviour index responsive to activation of an accelerator pedal kick-down switch.

Optionally the control means is configured to change the value of the driver behaviour index responsive to a speed of the vehicle.

Further optionally the control means is configured to change the value of driver behaviour index responsive to one selected from amongst a selected mode of a transmission of the vehicle and a state of a performance mode selector.

By performance mode selector is included a selector such as a dynamic mode or sport mode selector or any other suitable selector.

The vehicle may be operable to latch the engine in an on condition responsive to the driving style of the driver.

The vehicle may be configured to over-ride stopping of the engine when a difference between the second value and the current value of driver behaviour index is less than a prescribed value.

The control means may be arranged to determine whether a current driving style of a driver corresponds to an economy-oriented driving style or a performance-oriented driving style responsive to the value over time of at least one of:
  (a) a speed of rotation of the engine;
  (b) a gear ratio between the engine and one or more wheels of the vehicle;
  (c) a speed of at least one portion of a driveline of the vehicle;
  (d) driver demanded brake torque; and
  (e) driver demanded engine torque.

Advantageously the vehicle may be operable to provide feedback to the driver responsive to the determination whether the driving style corresponds to a performance oriented driving style or an economy oriented driving style.

The vehicle may be operable to provide feedback to the driver as to whether stopping of the engine is being over-ridden responsive to the driving style of the driver.

The vehicle may be operable to provide feedback by means of one selected from amongst visual indicator means, audible indicator means and haptic feedback means.

The visual indicator means may be provide by a display, a lamp, or any other suitable indicator means.

According to a further aspect of the invention for which protection is sought there is provided a method of controlling a stop/start motor vehicle, the method comprising:
  monitoring by means of control means a value over time of one or more parameters associated with the vehicle during a drive cycle;
  determining by means of the control means whether a current driving style of a driver corresponds to an economy-oriented driving style or a performance-oriented driving style responsive to the value of the one or more parameters over time; and over-riding stopping of the engine when it is determined that the driving style of the driver corresponds to a performance-oriented style.

The method may comprise the steps of:

calculating a value of a driver behaviour index responsive to the driving style of the driver; and over-ride stopping of the engine responsive to the value of driver behaviour index.

Advantageously the method may comprise the step of changing the value of the driver behaviour index towards a first value when the driver displays an economy-oriented driving style and changing the value of the driver behaviour index towards a second value when the driver displays a performance-oriented driving style.

The method may comprise the step of over-riding stopping of the engine when a difference between the second value of the driver behaviour index and the current value of driver behaviour index is less than a prescribed value.

According to a further aspect of the invention for which protection is sought, there is provided a motor vehicle comprising an engine, the vehicle having stop/start functionality in which control means of the vehicle is operable automatically to stop the engine responsive to a determination that the engine is not required to provide torque to drive the vehicle, wherein the control means is further operable to monitor a value of one or more parameters associated with the vehicle, the control means being arranged automatically to identify a current driving style of a driver ranging from an economy-oriented driving style to a performance-oriented driving style responsive to the value of the one or more parameters and to over-ride stopping of the engine when it is determined that the driving style of the driver corresponds to a performance-oriented style.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
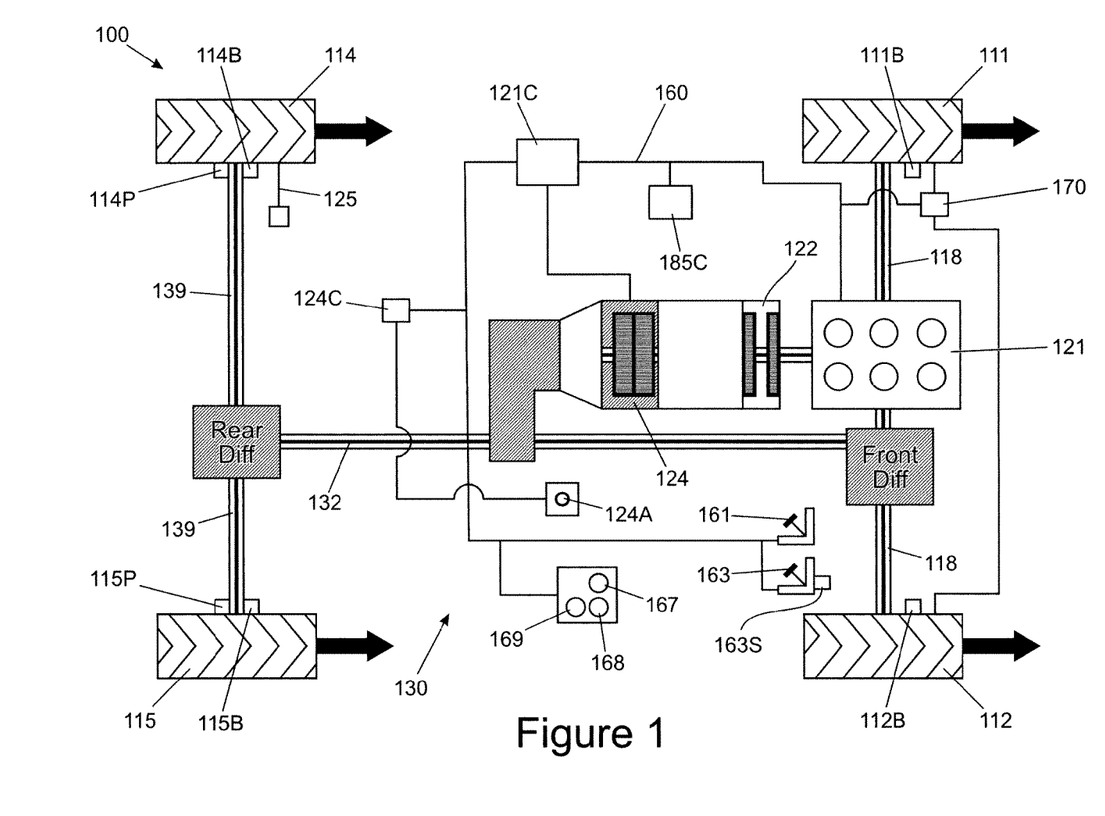
FIG. 1 is a schematic illustration of a stop/start vehicle according to an embodiment of the invention.

FIG. 1 shows a stop/start vehicle 100 according to an embodiment of the invention having an internal combustion engine 121, an automatic transmission 124 and a set of four wheels 111, 112, 114, 115. Each of the wheels has a respective disc brake 111B, 112B, 114B, 115B operable by means of a driver operated brake pedal 161 to decelerate the vehicle when the vehicle is moving. Rear wheels 114, 115 of the vehicle are also provided with a respective driver operated parking brake 114P, 115P each in the form of a drum brake. The parking brakes 114P, 115P are operable to be applied and released by means of a driver-operated parking brake actuator 168 in the form of a push-button actuator.

The vehicle 100 has an engine controller 121C, a brake controller 170, a transmission controller 124C and a body controller 185C. The controllers 121C, 170, 124C, 185C are arranged to communicate with one another by means of a controller area network (CAN) bus 160.

The engine 121 is operable to be started and stopped by means of the engine controller 121C. The engine controller 121C is arranged to implement a stop/start scheduler functionality whereby the controller 121C determines when the engine 121 should be stopped according to a stop/start control methodology. When it is determined that the engine 121 should be stopped the stop/start scheduler commands the engine controller 121C to stop the engine 121. When it is determined that the engine 121 should be restarted, the stop/start scheduler commands the engine controller 121C to restart the engine 121. It is to be understood that in the present embodiment stopping of the engine 121 is only performed when the vehicle 100 is stationary (or almost stationary). In some alternative embodiments stopping of the engine 121 may be performed whilst the vehicle 100 is moving. For example in some embodiments having electrically powered power steering and brake actuators stopping of the engine 121 may be performed whilst the vehicle 100 is moving, A 'dynamic' mode selector button 169 is provided that is operable by the driver to select the stop/start functionality. When in dynamic mode the vehicle 100 also reconfigures a gear shift map of the transmission controller 124C to provide enhanced vehicle acceleration performance. In some embodiments a configuration of a suspension system and/or one or more other systems of the vehicle 100 may also be changed.

The brake controller 170 is operable to apply the parking brakes or disc brakes according to signals received from the brake pedal 161 and parking brake actuator 168, respectively.

The transmission controller 124C is operable to control the transmission 124 to connect and disconnect the transmission 124 from the engine 121 by means of a clutch 122.

The controller 124C is also operable to control the transmission 124 to operate according to one of a plurality of modes of operation. A driver operated actuator 124A is coupled to the transmission controller 124C by means of which the driver may select the required mode.

In the embodiment of FIG. 1 the modes are: (1) a park mode in which the transmission 124 is disconnected from the engine 121 and a park mode pin element 125 is controlled to immobilise a rear wheel 114 of the vehicle; (2) a reverse mode in which the transmission 124 is arranged to drive the vehicle in a reverse direction; (3) a neutral mode in which the transmission 124 is disengaged from the engine 121 but the park mode pin element 125 is not engaged; (4) a drive mode in which the transmission 124 is engaged with the engine 121 and is operable automatically to select a required one of eight forward gears of the transmission 124; and (5) a low gear mode in which the transmission 124 is operable automatically to select a first or second gear only.

It is to be understood that other numbers of gears are also useful such as five, six, nine or any other suitable number of gears.

Other arrangements of the driver operated transmission actuator 124A are also useful.

It is to be understood that the vehicle 100 may be operable automatically to control the transmission 124 by means of the transmission controller 124C to assume the park mode when required.

The engine controller 121C is programmed to command the stop/start scheduler function block to over-ride stopping of the engine 121 (i.e. not to allow the engine 121 to be stopped) responsive to a manner in which the driver drives the vehicle, or 'driver behaviour', during the course of a drivecycle.

Reference herein to a block such as a function block is to be understood to include reference to software code for performing the function or action specified in which an output is provided responsive to one or more inputs. The code may be in the form of a software routine or function called by a main computer program, or be code forming part of a flow of code not being a separate routine or function. Reference to function block is made for ease of explanation of the manner of operation of the controller 121C.

The manner in which the driver drives the vehicle may be classified as either a relatively unaggressive, economy-oriented driving style for reducing vehicle emissions and fuel consumption or a relatively aggressive, performance-oriented driving style in which the driver places relatively high torque demands on the engine in order to achieve increased rates of acceleration of the vehicle 100 in a given driving situation.

Figure 2:
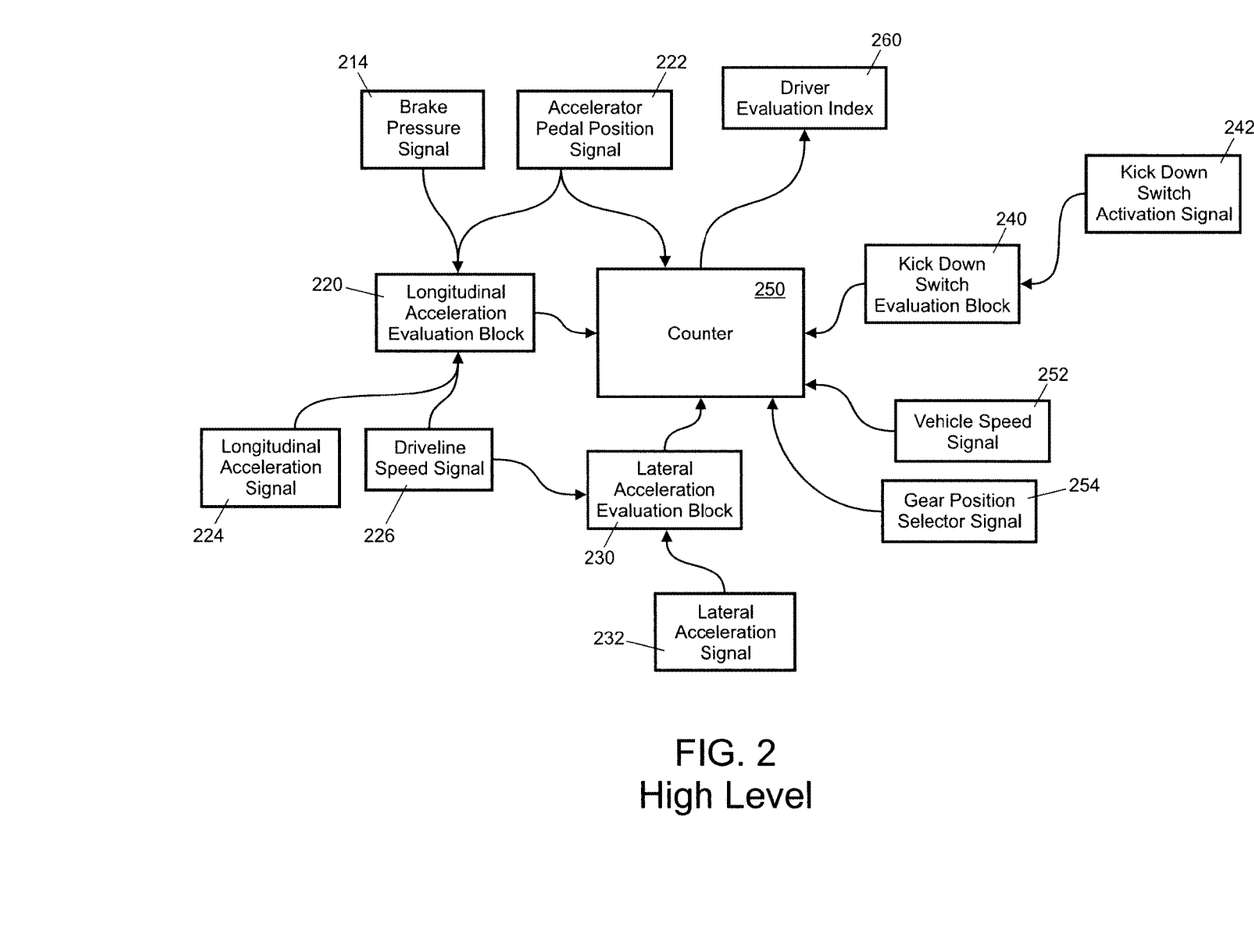
FIG. 2 is a schematic diagram showing parameters associated with a vehicle controller arranged to determine a value of a driver behaviour evaluation index.

FIG. 2 represents a flow diagram of a process in which the engine controller 121C determines a value of a driver evaluation index 260 responsive to driver behaviour. The driver evaluation index 260 may be considered to represent a measure of the extent to which a driver's driving behaviour corresponds to a performance-oriented driving style as opposed to an economy-oriented driving style.

In the present embodiment the evaluation index 260 is a number between zero and 200, lower values of the index 260 indicating a more economy-oriented driving style and higher values of the index 260 indicating a more performance-oriented driving style.

The controller 121C commands the stop/start scheduler function block to over-ride stopping of the engine 121 responsive to the value of the driver evaluation index 260.

As shown in FIG. 2, a longitudinal acceleration evaluation block 220 is implemented by the controller 121C and arranged to receive a brake pressure signal 214 from the brake controller 170 corresponding to an amount of brake pressure applied to the disc brakes 111B-115B of the vehicle 100. In addition the evaluation block 220 receives a longitudinal acceleration signal 224 being a signal responsive to a value of longitudinal acceleration of the vehicle 100, a driveline speed signal 226 being a signal responsive to a speed of a portion of a driveline 130 of the vehicle 100 and an accelerator pedal position signal 222 responsive to a position of the accelerator pedal 163. The block 220 is arranged to output a value of a longitudinal acceleration counter increment 225 (FIG. 3) to a driver evaluator counter function block 250. The counter increment value 225 is responsive to the brake pressure signal 214, the longitudinal acceleration signal 224, the driveline speed signal 226 and the accelerator pedal position signal 222 and indicates an amount by which the value of the driver evaluation index 260 should be increased in response to the longitudinal acceleration experienced by the vehicle 100.

It is to be understood that reference to a speed of a portion of the driveline 130 of the vehicle 100 may include reference to one or more of a speed of an input shaft of the transmission 124, a speed of an output shaft of the transmission 124, a speed of a drive shaft such as an auxiliary driveshaft 132, a front driveshaft 118 or a rear driveshaft 139, a speed of one or more wheels 111, 112, 114, 115 or any other suitable portion of the driveline 130.

Figure 4:
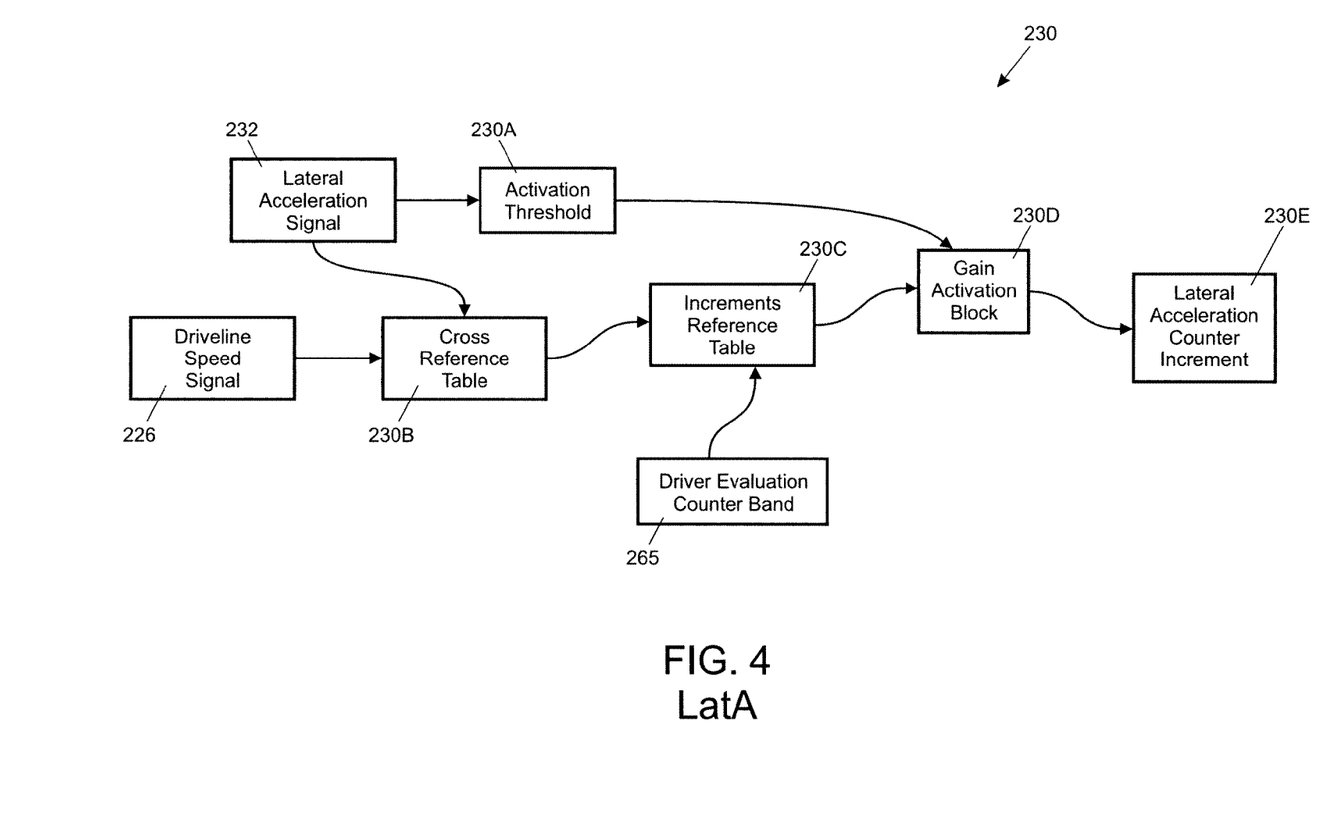
FIG. 4 is a schematic diagram of a lateral acceleration evaluation block of the controller of FIG. 2 showing steps in processing a lateral acceleration signal.

A lateral acceleration evaluation block 230 is also provided and is arranged to calculate a lateral acceleration counter increment value 230E (FIG. 4). Evaluation block 230 is arranged to receive the driveline speed signal 226 and in addition a lateral acceleration signal 232 being a signal responsive to a value of lateral acceleration experienced by the vehicle 100. The lateral acceleration evaluation block 230 is arranged to calculate the value of the lateral acceleration counter increment value 230E responsive to the driveline speed signal 226 and lateral acceleration signal 232.

A kick-down switch evaluation block 240 is arranged to calculate a value of a kick-down increment or kick-down behaviour index 240E (FIG. 5) responsive to a kick-down switch activation signal 242. The kick-down switch activation signal 242 is a signal the value of which is responsive to whether a driver has depressed the accelerator pedal 163 by an amount sufficient to activate a kick-down switch 163S. In the embodiment of FIG. 1 the kick-down switch 163S is arranged to be activated when the accelerator pedal 163 is fully depressed. In some arrangements the kick-down switch 163S is arranged to be activated when the accelerator pedal 163 is depressed by a smaller amount, for example by 95% or more of its full travel. Other arrangements are also useful.

As shown in FIG. 2, other signals are also fed to the driver evaluator counter function block 250 including a vehicle speed signal 252 being a signal having a value responsive to a speed of the vehicle 100, a gear position selector signal 254 having a value responsive to a gear position selected by the vehicle 100 and the accelerator pedal position signal 222. The counter function block 250 is arranged to calculate a value of the driver evaluation index value 260 responsive to the values of signals and indexes input thereto.

The value of the driver evaluation index value 260 is employed by the controller 121C to control operation of the vehicle responsive to the value of the driver evaluation index. In the present embodiment, the controller 121C employs the evaluation index value 260 to command the stop/start scheduler function block to over-ride stopping of the engine 121.

Figure 3:
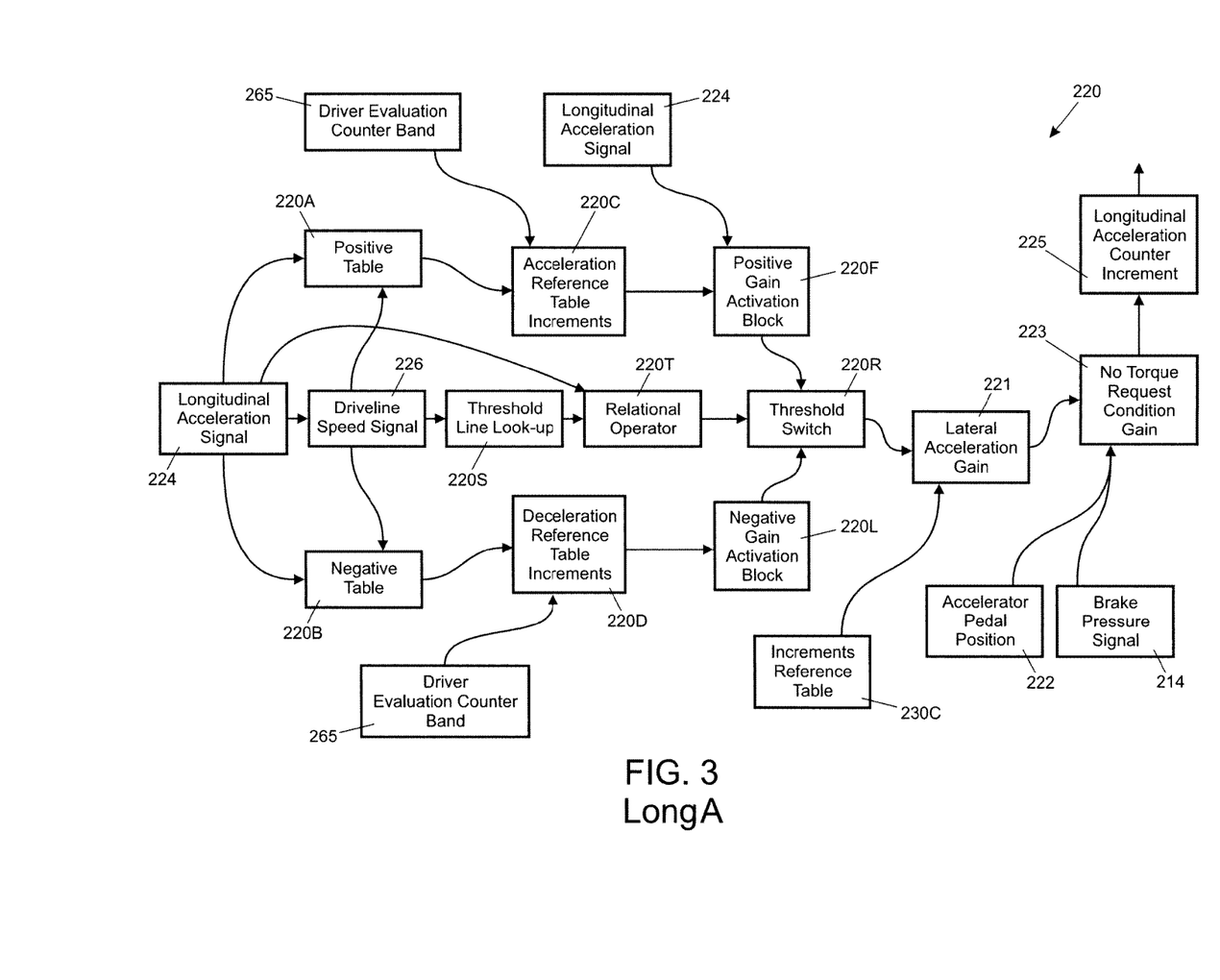
FIG. 3 is a schematic diagram of a longitudinal acceleration evaluation block of the controller of FIG. 2 showing steps in processing of acceleration and speed signals.

FIG. 3 is a schematic representation of the manner of operation of the longitudinal acceleration evaluation block 220. The longitudinal acceleration signal 224 is received by the block 220. The signal 224 together with the driveline speed signal 226 is then input to a positive table function block 220A and to a negative table function block 220B. The positive table function block 220A is configured to determine a reference index value from a dataset relating the value of the longitudinal acceleration signal 224 to the value of the driveline speed 226. The reference index is output to an acceleration reference table increments function block 220C. Increments function block 220C is arranged to output to a positive gain activation function block 220F a suggested increment of the longitudinal acceleration counter increment 225, the value being dependent on the reference index value output by the positive table function block 220A and a current value of a driver evaluation counter band 265.

It is to be understood that the value of driver evaluation counter band 265 indicates which one of four ranges or 'bands' of values of driver evaluation index 260 the current value of the index 260 falls within. Thus the value of counter band 265 identifies a particular range of values within which the value of the evaluation index 260 falls. In some alternative embodiments the value of counter band indicates which one of a different number of ranges of values the current value of the index 260 falls within such as 2, 3, 5, 6, 7, 8, 9, 10 or more ranges.

In the present embodiment the driver evaluation index 260 is arranged to assume a value from 1 (corresponding to non-aggressive behaviour) to 200 (corresponding to highly aggressive behaviour). Other ranges of values are also useful in some embodiments.

The value of counter band 265 is set to a value 0 if the value of evaluation index 260 is from 1 to 50, to a value of 1 if the value of evaluation index 260 is from 51 to 100, to a value of 2 if the evaluation index 260 is from 101 to 150 and to a value of 3 if the evaluation index 260 is from 151 to 200. Other ranges for the counter bands are also useful.

Thus it is to be understood that the positive table function block 220A and acceleration reference table increments function block 220C allow mapping of three input signals (longitudinal acceleration 224, driveline speed 226 and driver evaluation counter band 265) onto a single output which is fed to the positive gain activation block 220F. Thus, the output fed to gain activation block 220F and ultimately the value of longitudinal acceleration counter increment 225 output to the counter function block 250 are both responsive to these three input signals.

It is to be understood that the value fed to the positive gain activation block 220F by increments function block 220C may be arranged to be less for counter band values representing higher values of evaluation index 260 than for bands representing lower values. Thus, in some embodiments, for counter bands representing lower values of evaluation index 260 the value fed to the positive gain activation block 220F may be arranged to cause a more rapid rise in evaluation index 260 for a given value of longitudinal acceleration and driveline speed 226 compared with that for counter bands representing higher values of evaluation index 260.

As noted above the positive gain activation function block 220F receives as an input the output of the acceleration reference table increments function block 220C and in addition the value of a longitudinal acceleration signal 224. Function block 220F is configured to output the value input from function block 220C for a prescribed period of time to a threshold switch function block 220R.

Function block 220F integrates the duration of each acceleration event so that if an event lasts longer than the prescribed period, function block 220F sets the value of the output thereof to zero. This feature has the effect that an amount by which the value of driver evaluation index 260 can increase over a given acceleration event is not limited to a particular value whilst the acceleration event is taking place. However, the period during which the value of the evaluation index 260 can increase during a single acceleration event is limited. This functionality allows for greater flexibility in the calibration of the amount by which the evaluation index 260 can increase. In some arrangements the contribution of specific signal values to the value of evaluation index 260 may therefore be arranged to depend on the time at which they occur during the acceleration event.

In one embodiment, function block 220F passes to the threshold switch 220R the increments value input to it from function block 220C for a prescribed period, such as a period of 5 s. However the function block 220F subsequently passes half the value input to it from function block 220C for a further prescribed period.

In other words, for the initial period of 5 s function block 220F allows through 100% of the value input to it, and then for a subsequent period of 5 s it allows through 50% of the value input to it. If the acceleration event continues beyond 10 s the function block sets the increment value to zero effectively freezing the contribution to the value of driver evaluation index 260 made by the longitudinal acceleration evaluation block 220 during a given acceleration event.

Other arrangements are also useful such as other prescribed periods of time and other relative amounts of increment value passed by function block 220F.

For the avoidance of doubt it is to be understood that a given acceleration event is defined by the period of time for which the value of longitudinal acceleration rises above a threshold value before falling back below a threshold value. The threshold value above which a longitudinal acceleration event is considered to commence may be the same as or different from that below which the event is considered to end. In some embodiments the threshold value above which the event is considered to commence is greater than that below which it is considered to end thereby to prevent spurious detection of acceleration events. For example if the threshold value is the same for the commencement and ending of a longitudinal acceleration event and the value of longitudinal acceleration detected by the vehicle 100 varies relatively rapidly about a given threshold value due to signal noise or other effects not related to driver behaviour, the value of longitudinal acceleration counter increment 225 may not be representative of a driver's behaviour in respect of longitudinal acceleration.

Other arrangements are also useful.

Reference to a given positive longitudinal acceleration event is to be understood to be reference to a period during which a sensor detects that a value of longitudinal acceleration is positive and meets positive threshold criteria as described above.

The negative table function block 220B is configured to determine a reference index value responsive to the longitudinal acceleration signal 224 and driveline speed signal 226. The reference index value is output to a deceleration reference table increments function block 220D. Increments function block 220D is arranged to output to a negative gain activation block 220L a suggested value of the longitudinal acceleration counter increment 225 based on the value output by the negative table function block 220B and the value of driver evaluation counter band 265. Thus the value output by increments function block 220D is a function of longitudinal acceleration signal 224, driveline speed signal 226 and the value of the driver evaluation counter band 265.

The suggested value output by function block 220D may be negative, indicating that the longitudinal acceleration evaluation function block 220 has determined that the value of driver evaluation index 260 should be decreased responsive to the values of parameters input to it. In the present embodiment the deceleration reference table increments function block 220D is the only function block that may suggest a decrease in the value of the driver evaluation index 260. Other arrangements in which other function blocks may also suggest a decrease are also useful.

Function block 220D may suggest an increase in the value of driver evaluation index 260 in the event that heavy braking takes place. In the event that relatively light braking takes place the function block 220D may suggest a decrease in the value of driver evaluation index 260. In the event that moderate braking takes place the function block 220D may suggest that no change in the value of driver evaluation index 260 takes place.

In the event that the vehicle travels at a constant speed or experience light acceleration the function block 220D may also suggest a decrease in the value of driver evaluation index 260. In the event of moderate acceleration the function block 220D may suggest that no change in the value of driver evaluation index 260 takes place.

Negative gain activation block 220L is arranged to integrate the value input to it for the duration of each braking event. Whilst the value of the integral of the input is below a prescribed value the output of the activation block 220L (provided to a threshold function block 220R) corresponds to the value input to it from function block 220D. However once the integrated value exceeds the prescribed value the value output by the activation block 220L is set to zero. This feature limits the effect that a single negative acceleration event can have on the value of driver evaluation index.

Reference to a negative acceleration event (i.e. a deceleration event) is to be understood to be reference to a period during which a sensor detects that a value of longitudinal acceleration is below a prescribed threshold indicating that the longitudinal acceleration is sufficiently negative.

It is to be further understood that whilst the negative gain activation block 220L places a limit on the amount by which the driver evaluation index 260 can increase for a given deceleration event, no limit is placed on the amount by which the value of driver evaluation index 260 can decrease.

This is so as to allow a smooth, continuous decrease in the value of driver evaluation index 260 when the driver behaviour merits a decrease. Other arrangements are also useful.

The threshold function block 220R is arranged to output to a lateral acceleration gain function block 221 the value input to it from the positive or negative gain activation blocks 220F, 220L responsive to an input from a relational operator function block 220T.

The relational operator function block 220T receives as input signals the longitudinal acceleration signal 224 and an output of a threshold line look-up function block 220S. The threshold line look-up function block 220S receives as an input the driveline speed signal 226.

Function block 220S outputs to the relational operator function block 220T a value of a vehicle acceleration parameter determined by reference to a look-up table responsive to the value of the driveline speed signal 226.

The relational operator function block 220T is arranged to control the threshold switch 220R to allow the output of the positive gain activation function block 220F or the output of the negative gain activation function block 220L to be passed to the lateral acceleration gain function block 221. This functionality is achieved by comparing the longitudinal acceleration signal 224 to the vehicle acceleration parameter determined by function block 220S.

In the embodiment described the output of the positive gain activation function block 220F is passed to the lateral acceleration gain function block 221 if the value of the longitudinal acceleration signal 224 is greater than the vehicle acceleration parameter.

In the case that the longitudinal acceleration signal 224 is less than the vehicle acceleration parameter, the output of the negative gain activation block 220L is passed to the lateral acceleration gain function block 221.

It is to be understood that the value of acceleration parameter is arranged such that whilst the vehicle 100 is cruising (and longitudinal acceleration is substantially zero), the threshold switch function block 220R passes the output of the negative gain activation function block 220L to the lateral acceleration gain function block 221, the output of the negative gain activation function block 220L being negative. Thus the longitudinal acceleration counter increment value 225 is also more likely to be negative, increasing the likelihood of a decrease in the value of the driver behaviour index 260. In some arrangements the threshold switch function block 220R passes the output of the negative gain activation function block 220L to the lateral acceleration gain function block 221 when the vehicle is experiencing light acceleration, the output of the negative gain activation function block 220L also being negative.

If the driver performs a light braking action in which a rise in brake pressure is relatively low the function block 220 is arranged whereby the negative gain activation function block 220L also passes a negative value of increment through the threshold switch 220R, as noted above.

If the driver performs medium braking, in which a rise in brake pressure is higher than that in the case of light braking but less than that for relatively heavy braking the output of the negative gain activation block 220L is set such that the counter increment value 225 will most likely be zero as also noted above, and the output of block 220L is passed through the threshold switch 220R.

For relatively heavy braking, the output of the deceleration reference table increments function block 220D (and therefore the negative gain activation block 220L) is set to a positive value such that the counter increment value 225 will most likely be positive, indicating that the value of driver behaviour index 260 should be increased, and passed through the threshold switch 220R.

It is to be understood that brake pressure threshold values distinguishing light, medium and heavy braking may be determined according to the braking system used to achieve the desired result. Optionally the threshold values may be responsive to one or more other parameters to compensate for variations in brake pressure for a given rate of deceleration (and therefore perceived driver behaviour). For example, the threshold values may be changed responsive to vehicle attitude, for example whether the vehicle is on an incline and whether the vehicle is moving uphill or downhill. This is because when a vehicle is descending a hill a driver may be required to apply greater brake pedal pressure in order to obtain a given rate of deceleration of the vehicle compared with that when driving on a horizontal surface or when ascending the hill.

In some embodiments, the value of driver behaviour index 260 may be increased or decreased in the event the driver selects a different operating mode of the transmission. For example if sport mode (or 'dynamic mode') is selected the value of behaviour index 260 may be increased to a value responsive to which the control module 121C may latch the engine 121 in the on condition and not allow the engine 121 to be turned off automatically by the control module 121C to save fuel. If the sport mode is deselected the value of behaviour index 260 may be decreased by a prescribed amount. Other arrangements are also useful.

The lateral acceleration gain function block 221 outputs to a no torque request condition gain function block 223 the value input to it from the threshold function block 220R. However the function block 221 is arranged such that if the value output by an increments reference table 230C of the lateral acceleration evaluation block 230 (FIG. 4) is non-zero the output of the lateral acceleration gain function block 221 is frozen. That is, it is not allowed to decrease or to increase. Thus in these circumstances the lateral acceleration gain function block 221 prevents the value output by if from falling below zero.

This feature has the advantage that if a driver is driving aggressively and negotiates a tight bend without accelerating the vehicle aggressively parallel to its longitudinal axis, the longitudinal acceleration evaluation block does not mistakenly determine the driver is driving less aggressively simply because the vehicle 100 is not experiencing significant longitudinal acceleration. Rather, the vehicle 100 detects that the vehicle 100 is cornering with a value of lateral acceleration above a prescribed threshold (e.g. when the condition is met that the lateral acceleration increments reference table function block 230C outputs a non-zero value) and freezes the value of longitudinal acceleration counter increment 225.

Thus the gain function block 221 is arranged to prevent the value of driver behaviour index 260 from falling when the vehicle 100 is negotiating a corner and the vehicle 100 experiences high lateral acceleration but little or no longitudinal acceleration.

The no torque request condition gain function block 223 also has as an input the accelerator pedal position signal 222 and brake pressure signal 214. Function block 223 is arranged to output to the counter function block 250 the value input to it from the lateral acceleration gain function block 221 as a longitudinal acceleration counter increment 225. However if the function block 223 determines that the driver has taken his foot off the accelerator pedal 163 without depressing the brake pedal 161 (i.e. the vehicle is coasting), the function block sets the value of longitudinal acceleration counter increment 225 outputted by it to zero. This has the effect of preventing a decrease in the value of driver behaviour index 260 in response to an output from the longitudinal acceleration evaluation block 220.

FIG. 4 is a schematic representation of a manner of operation of the lateral acceleration evaluation block 230. The driveline speed signal 226 and lateral acceleration signal 232 are both input to a cross reference table function block 230B that provides an output responsive to the values input thereto. This output is provided to an increments reference table function block 230C that has as an input the driver evaluation counter band value 265. Function block 230C provides an output to a gain activation function block 230D responsive to the value input to it from the cross reference table function block 230B and the driver evaluation counter band value 265. It is to be understood that the cross reference table function block 230B and increments reference table function block 230C are arranged to allow mapping of the driveline speed signal 226, lateral acceleration signal 232 and driver evaluation counter band value 265 to a suggested value of required lateral acceleration counter increment value 230E.

The gain activation function block 230D also receives as an input a signal from an activation threshold function block 230A which in turn has as an input the lateral acceleration signal 232.

The activation threshold function block 230A together with the gain activation function block 230D are arranged such that if the value of the lateral acceleration signal 232 input to function block 230A exceeds a prescribed threshold value, the suggested value of required lateral acceleration counter increment value output by the increments reference table function block 230C is output by the gain activation block 230D as the lateral acceleration counter increment value 230E.

Whilst the gain activation block 230D is outputting the value input to it by the increments reference table function block 230C, block 230D is arranged to integrate the value input to it by function block 230C.

The gain activation block 230D continues to output the value input to it by function block 230C until the integral of this value over a given lateral acceleration event (being a period for which the lateral acceleration signal exceeds the prescribed threshold value) exceeds a threshold integral value. Once the integral exceeds the threshold integral value the value of lateral acceleration counter increment value 230E output by activation block 230D is set to zero.

In some embodiments the gain activation block 230D is arranged to set the value of lateral acceleration counter increment 230E to zero after a prescribed period has elapsed since the activation threshold function block determined that the value of lateral acceleration signal 232 exceeded the prescribed threshold, regardless of whether the integral of the output of function block 230C exceeds the threshold integral value.

In some embodiments, the gain activation block 230D is arranged to integrate 100% of the value input from function block 230C for a prescribed period (such as 2 s) and then 50% of the value input to it for a further prescribed period (such as 3 s) and then to set the output of gain activation block 230D to zero unless the integrated value of the signal input from function block 230C exceeds the prescribed threshold integral value before expiry of the further prescribed period.

The lateral acceleration evaluation block 230 provides a valuable functionality by limiting the amount by which the value of driver evaluation index 260 can increase in a given lateral acceleration event. Thus it is to be understood that when the driver negotiates a given bend in a road, where the value of lateral acceleration signal 232 is sufficient to trigger the gain activation block 230D to output the value input to it from the increments reference table function block 230C, the lateral acceleration evaluation block 230 limits the amount by which the driver behaviour index 260 can increase.

It is to be understood that a driver may negotiate a relatively tight bend in a relatively non-aggressive manner and still subject the vehicle to relatively high values of lateral acceleration. Thus, since the amount by which the driver behaviour index 260 can increase for a given bend is limited the vehicle is prevented from 'over-reacting' to high values of lateral acceleration, increasing the value of the driver behaviour index 260 by too large an amount.

Figure 5:
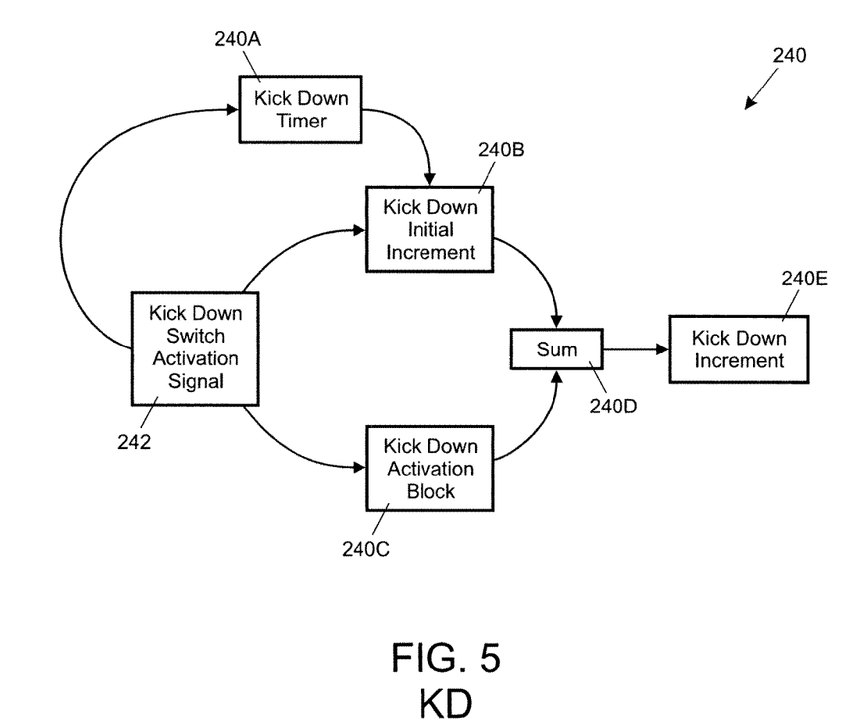
FIG. 5 is a schematic diagram of a kick-down switch evaluation block of the controller of FIG. 2 showing steps in processing a kick-down switch activation signal.

FIG. 5 shows an embodiment of the kick down switch evaluation block 240. The kick down switch activation signal 242 is provided to a kick down timer function block 240A, a kick down initial increment function block 240B and a kick down activation function block 240C.

The evaluation block 240 is configured to output a kick-down increment value 240E being a value by which the driver behaviour index 260 should be increased responsive to activation of the kick-down switch 163S. The block 240 is arranged to limit the amount by which the behaviour index 260 can be increased responsive to the increment value 240E during a given period for which the kick-down switch 163S is activated. Similarly, the block 240 is arranged to limit an amount by which the behaviour index 260 may be incremented responsive to the increment value 240E if the kick-down switch 163S is activated more than once within a prescribed time period.

The timer function block 240A is arranged to commence timing when the switch activation signal 242 indicates the kick-down switch 163S has been activated.

When the timer function block 240A commences timing, the kick-down initial increment function block 240B is configured to output an initial increment value to a sum function block 240D for a prescribed time period determined by reference to the timer function block 240A. That is, when the kick-down switch 163S is activated, the initial increment function block 240B outputs a value (such as integer 10) to the sum function block 240D for a prescribed period of time such as a period of 1 s. Once the period of 1 s has expired the initial increment function block 240B outputs a value of zero.

In some embodiments the initial increment function block 240B outputs a non-zero value for a single time step such that a single step increase in the value of kick-down increment 240E (and therefore of driver evaluation index 260) occurs.

If the switch 163S is released and re-activated within a prescribed period of the initial activation event, the output of the initial increment function block 240B remains set to zero. If the switch is reactivated after expiry of the prescribed period following the initial activation event the output of function block 240B is set to 10 for the prescribed period (1 s in the present example) provided the kick-down switch 163S remains activated throughout this prescribed period. If the switch 163S is released before this period expires, for example after a period of 0.5 s, the output of the function block 240B is set to zero when the switch 163S is released.

Meanwhile, when the kick-down activation signal 242 is received by the kick-down activation block 240C, activation block 240C outputs a fixed value (such as integer 3) to the sum function block 240D during the period for which the kick-down activation signal 242 is received, i.e. the period for which the kick-down switch 163S is depressed.

It is to be understood that the sum function block 240D outputs a value of kick-down increment 240E being the sum of the outputs of the initial increment function block 240B and the kick-down activation block 240C at any given moment in time.

In some arrangements the activation block 240C is arranged to change the value output by it to the sum function block 240D as a function of time during the period for which the kick-down switch 163S is activated. This is in order to limit the amount by which the driver behaviour index 260 may be incremented over a given period for which the kick-down switch 163S is activated.

In one embodiment, when the kick-down switch 163S is initially activated (in an 'initial activation event'), the kick-down activation block 240C outputs a prescribed value (such as increment value 3) for a prescribed period (say 10 s) before outputting a value of zero for the remainder of the period for which the kick-down switch 163S remains depressed.

In some other embodiments the activation block 240C is arranged to provide an output that decreases more gradually as a function of time. In one embodiment the value output by activation block 240C is set to a value of (say) 3 for a period of 10 s, then to a value of 2 for a period of 5 s, then to a value of zero for the remainder of the period for which the switch 163S is activated.

If the switch 163S is released and subsequently re-activated within a prescribed period of the initial activation event (say 20 s), activation block 240C re-commences providing output values as if the activation event was an initial activation event. Thus in the present example the activation function block 240C provides an output value of 3 for a period of 10 s, subsequently a value of 2 for a further period of 5 s and subsequently a value of zero unless the switch 163S is released earlier.

Figure 6:
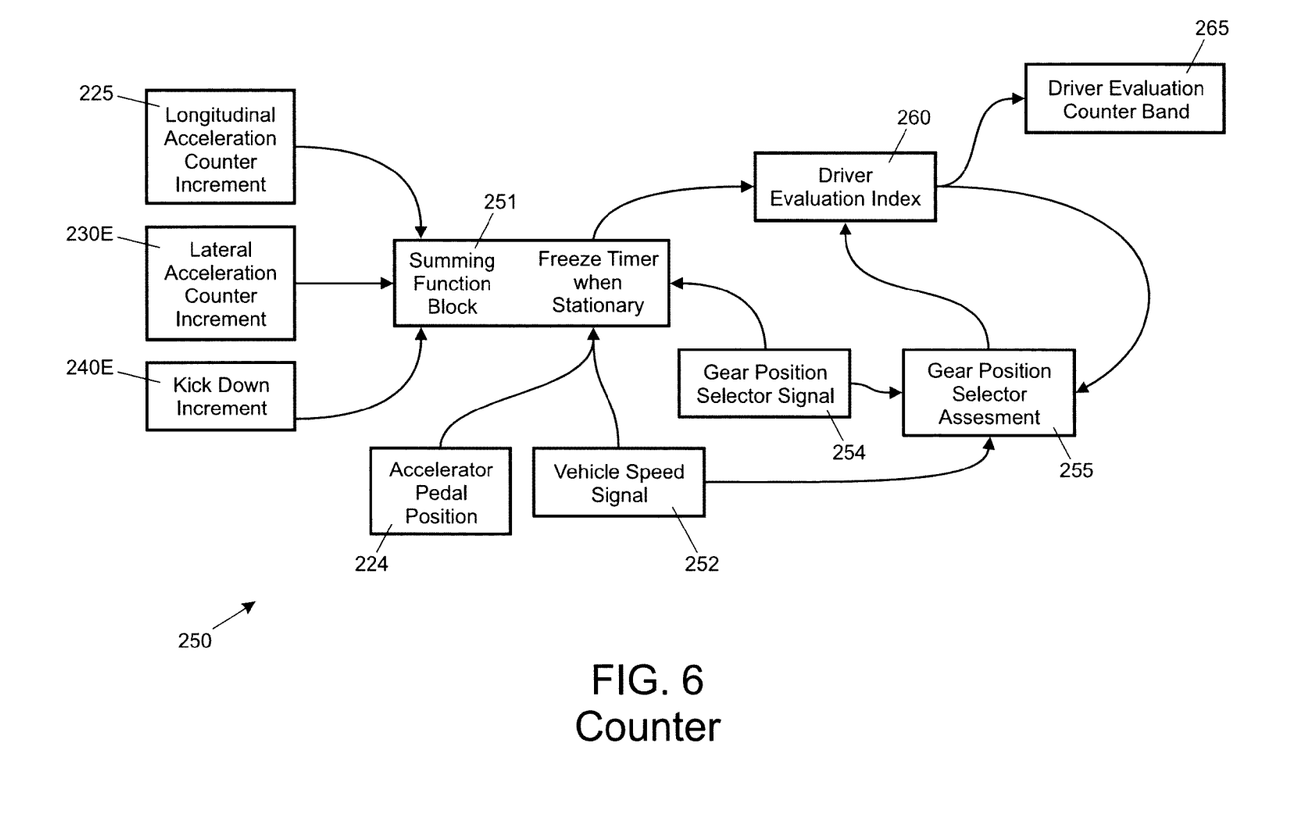
FIG. 6 is a schematic diagram of a counter block of the controller of FIG. 2 showing a process in which output signals from other blocks of the controller are brought together to generate a driver behaviour evaluation index value.

FIG. 6 shows an embodiment of the driver evaluator counter function block 250.

The counter function block 250 has a summing function block 251 that receives increment signals 225, 230E and 240E and sums the signals 225, 230E, 240E to form a single increment value. The signals 225, 230E, 240E are added to form a running total value at prescribed time intervals or time steps. The running total is output by the summing function block 251 as the driver behaviour evaluation index 260.

The summing function block 251 also receives the accelerator pedal position signal 224, the vehicle speed signal 252 and gear position selector signal 254 being a signal responsive to a position of the transmission selector control 167 (FIG. 1).

The summing function block 251 is arranged to freeze the value of driver behaviour evaluation index 260 output thereby for a prescribed period of time (i.e. the summing function block 251 does not allow the driver evaluation index 260 to increase or decrease in value) when the vehicle is stationary as determined by reference to the speed signal 252.

Thus for example if the vehicle 100 is stationary at a set of traffic lights or whilst picking up or dropping off a passenger, the driver evaluation index 260 may be frozen for a period of up to 20 s. Other periods of time are also useful.

It is to be understood that if the value of driver evaluation index 260 is not frozen, it is likely to decrease whilst the vehicle 10 is stationary since the driver has less opportunity to demonstrate aggressive behaviour when stationary. However the driver may wish to continue driving aggressively once the traffic lights permit him to continue his journey, or the passenger has exited the vehicle 100. By freezing the value of driver evaluation index 260, a risk that the vehicle 100 mistakenly determines that the driver is driving less aggressively is reduced.

The vehicle speed signal 252 and transmission selector control 167 are also used to determine the value that the driver evaluation index 260 is to have following a change to the position of the transmission selector control 167.

If the position of the selector control 167 is changed whilst the vehicle 100 is at rest, the value of driver evaluation index 260 is restored to a default value that is calibrated for each driving mode of the transmission, i.e. for each position of the transmission selector control 167 in which the vehicle may be driven.

If whilst the vehicle 100 is moving the driver changes the position of the transmission selector control 167 the default value of the driver evaluation index 260 for the mode corresponding to the newly selected position of the control 167 is compared with the current value of driver evaluation index 260. In some embodiments, if the default value for that mode is less than the current value of driver evaluation index 260 the value of driver evaluation index 260 remains unchanged. In some embodiments, if the default value for that mode is greater than the current value of driver evaluation index 260 the value of driver evaluation index is increased to the default value.

Other arrangements are also useful.

The value of driver evaluation index 260 is fed to a driver evaluation counter band function block 265 that determines within which one of four bands of values of the index 260 the current value of the driver evaluation index 260 falls as described above.

The counter band value 265 is then output to an energy management control portion of the controller 121C, as well as to the various function blocks described herein that use the value 265. It is to be understood that the counter band value 265 plays an important role in the calibration of the various maps employed by the controller 121C in order to allow the controller 121C to adjust a sensitivity of the value of driver evaluation index 260 to driver behaviour responsive to the current value of driver evaluation index 260.

Embodiments of the present invention have the advantage that a performance of the vehicle 100 may be optimised for a particular style of driving adopted by a driver on a given journey. Embodiments of the invention have the advantage that the driver may enjoy enhanced vehicle performance and a reduced risk of reduction in vehicle performance when the driver demands a relatively high amount of torque from the engine 121 following an automatic stopping of the engine 121 by the controller 121C.

Furthermore embodiments of the invention have the advantage that a driver is not required manually to select a sport or dynamic mode of operation in which engine stop/start functionality is suspended in order to enjoy enhanced performance. Rather, the vehicle responds automatically to driver behaviour by means of the driver behaviour evaluation functionality of the vehicle 100. The vehicle 100 suspends automatically stop/start functionality when the behaviour evaluation functionality determines the driver is driving in a performance-oriented style rather than an economy-oriented style.

Embodiments of the invention have the further advantage that the controller 121C may resume automatically normal stop/start functionality following a period in which stop/start functionality has been suspended. That is, when the controller 121C determines (responsive to the driver behaviour evaluation functionality) that the driver's driving style is now an economy-oriented style rather than a performance-oriented style, the controller 121C resumes normal stop/start functionality.

Other arrangements are also useful.

Embodiments of the present invention may be understood by reference to the following numbered paragraphs:

1. A controller for a motor vehicle having an engine and an engine control system operable automatically to stop the engine in dependence on a determination that the engine is not required to provide torque to drive the vehicle, wherein the controller is configured to:

monitor one or more parameters associated with the vehicle during a drive cycle;

determine whether a current driving style of a driver corresponds to a first driving style or a second driving style in dependence on the value of the one or more parameters over time during the drive cycle; and to over-ride stopping of the engine by the engine control system when it is determined that the driving style of the driver corresponds to the second driving style.

2. A controller as described in paragraph 1 configured to calculate a value of a driver behaviour index in dependence on the driving style of the driver and to over-ride stopping of the engine responsive to the value of driver behaviour index.

3. A controller as described in paragraph 2 configured to change the value of the driver behaviour index towards a first value when the driver displays the first driving style and to change the value of the driver behaviour index towards a second value when the driver displays the second driving style.

4. A controller as described in paragraph 3 configured to change the value of the driver behaviour index towards the second value in dependence on a value of longitudinal acceleration of the vehicle.

5. A controller as described in paragraph 4 configured to change the value of driver behaviour index towards the second value when the value of longitudinal acceleration is more positive than an index increase positive threshold value being a positive acceleration value or is more negative than an index increase negative threshold value being a negative acceleration value.

6. A controller as described in paragraph 4 configured to change the value of driver behaviour index towards the first value when the value of longitudinal acceleration is between an index decrease positive threshold value being a positive value and an index decrease negative threshold value being a negative value.

7. A controller as described in paragraph 4 configured to prevent the value of driver behaviour index changing in dependence on the value of longitudinal acceleration, in dependence on a value of lateral acceleration.

8. A controller as described in paragraph 7 configured to prevent the value of driver behaviour index changing in dependence on the value of longitudinal acceleration when the value of lateral acceleration exceeds a prescribed value.

9. A controller as described in paragraph 2 configured to change the value of the driver behaviour index in dependence on one of a value of driver-demanded brake pressure and a value of driver-demanded brake torque of the vehicle.

10. A controller as described in paragraph 9 configured to change the value of the driver behaviour index towards a first value when the driver displays the first driving style and to change the value of the driver behaviour index towards a second value when the driver displays the second driving style, the controller being further configured to change the value of the driver behaviour index towards the first value when the value of said one of driver demanded brake pressure and driver demanded brake torque is below a prescribed value.

11. A controller as described in paragraph 2 configured to change the value of driver behaviour index in dependence on at least one selected from amongst brake pedal pressure, brake pedal position, rate of change of brake pedal pressure and rate of change of brake pedal position.

12. A controller as described in paragraph 2 configured to change the value of the driver behaviour index in dependence on at least one selected from amongst accelerator pedal position and a rate of change of accelerator pedal position.

13. A controller as described in paragraph 2 configured to change the value of the driver behaviour index in dependence on activation of an accelerator pedal kick-down detector.

14. A controller as described in paragraph 2 configured to change the value of the driver behaviour index in dependence on a speed of the vehicle.

15. A controller as described in paragraph 2 configured to change the value of driver behaviour index in dependence on one selected from amongst a selected gear of a transmission of the vehicle and a state of a performance mode selector.

16. A controller as described in paragraph 1 operable to latch the engine in an on condition in dependence on the driving style of the driver.

17. A controller as described in paragraph 3 configured to command over-ride stopping of the engine when a difference between the second value of the driver behaviour index and the current value of driver behaviour index is less than a prescribed value.

18. A controller as described in paragraph 1 arranged to determine whether a current driving style of a driver corresponds to the first driving style or the second driving style in dependence on the value over time of at least one of:
  (a) a speed of rotation of the engine;
  (b) a gear ratio between the engine and one or more wheels of the vehicle;
  (c) a speed of at least one portion of a driveline of the vehicle.

19. A controller as described in paragraph 1 wherein the first driving style corresponds to an economy-oriented driving style.

20. A controller as described in paragraph 1 wherein the second driving style corresponds to a performance-oriented driving style.

21. A vehicle comprising a controller according to paragraph 1.

22. A vehicle as described in paragraph 21 operable to provide feedback to the driver in dependence on an outcome of the determination by the controller whether the driving style corresponds to the first driving style or the second driving style.

23. A vehicle as described in paragraph 21 operable to provide feedback to the driver as to whether stopping of the engine is being over-ridden due to the driving style of the driver.

24. A vehicle as described in paragraph 22 operable to provide feedback by one selected from amongst a visual indicator device, an audible indicator device and a haptic feedback device.

25. A method of controlling a stop/start motor vehicle, the method comprising:
  monitoring by means of a controller a value over time of one or more parameters associated with the vehicle during a drive cycle;
  determining by means of the controller whether a current driving style of a driver corresponds to a first driving style or a second driving style responsive to the value of the one or more parameters over time; and
  over-riding stopping of the engine when it is determined that the driving style of the driver corresponds to the second driving style.

26. A method as described in paragraph 25 comprising the steps of:
  calculating a value of a driver behaviour index responsive to the driving style of the driver; and
  over-riding stopping of the engine responsive to the value of driver behaviour index.

27. A method as described in paragraph 26 comprising the step of change the value of the driver behaviour index towards a first value when the driver displays the first driving style and changing the value of the driver behaviour index towards a second value when the driver displays the second driving style.

28. A method as described in paragraph 27 comprising the step of over-riding stopping of the engine when a difference between the second value of the driver behaviour index and the current value of driver behaviour index is less than a prescribed value.

29. A method as described in paragraph 25 whereby the first driving style corresponds to an economy-oriented driving style.

30. A method as described in paragraph 25 whereby the second driving style corresponds to a performance-oriented driving style.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle control system comprising
a controller configured to:
  implement a start/stop functionality to automatically stop an associated motor vehicle engine;
  monitor one or more parameters associated with a motor vehicle during a drive cycle;
  determine a value of a driver behavior index based on a value of the one or more parameters over time during the drive cycle;
  determine whether a current driving style of a driver corresponds to a first driving style or a second driving style in dependence on the value of the driver behavior index;
  wherein the value of the driver behavior index is a value from a range of values, wherein values at a first end of the range are assigned to the first driving style and values at a second end of the range are assigned to the second driving style;
  determine whether the motor vehicle engine is not required to provide torque to drive the motor vehicle;
  over-ride implementing the start/stop functionality to prevent stopping the associated motor vehicle engine when it is determined that the motor vehicle engine is not required to provide torque to drive the motor vehicle and the value of the driver behavior index corresponds to the second driving style;
  while over-riding implementing the start/stop functionality to prevent stopping the associated motor vehicle engine, decrease a current value of the driver behavior index, to a value toward the first end of the range compared to the current value;
  wherein when it is determined that the motor vehicle engine is not required to provide torque to drive the motor vehicle and the value of the driver behavior index corresponds to the second driving style, the controller is configured to freeze the value of the driver behavior index for a prescribed amount of time before decreasing the value of the driver behavior index while it is determined that the motor vehicle engine is not required to provide torque to drive the motor vehicle;
  only implement the start/stop functionality to stop the associated motor vehicle engine when the controller determines that the value of the driver behavior index corresponds to the first driving style and the motor vehicle engine is not required to provide torque to drive the motor vehicle; and when the value of the driver behavior index has changed to correspond to the first driving style, automatically re-implement the start/stop functionality.

2. A vehicle control system as claimed in claim 1, wherein the controller is configured to change the value of the driver behavior index toward a first value when the driver displays the first driving style and to change the value of the driver behavior index toward a second value when the driver displays the second driving style.

3. A vehicle control system as claimed in claim 2, wherein the controller is configured to change the value of the driver behavior index toward the second value in dependence on a value of longitudinal acceleration of the motor vehicle.

4. A vehicle control system as claimed in claim 3, wherein the controller is configured to change at least one of the value of the driver behavior index toward the second value when the value of longitudinal acceleration is more positive than an index increase positive threshold value being a positive acceleration value or the value of longitudinal acceleration is more negative than an index increase negative threshold value being a negative acceleration value; and the value of the driver behavior index toward the first value when the value of longitudinal acceleration is between an index decrease positive threshold value being a positive value and an index decrease negative threshold value being a negative value.

5. A vehicle control system as claimed in claim 3, wherein the controller is configured to prevent the value of the driver behavior index changing in dependence on the value of longitudinal acceleration, in dependence on a value of lateral acceleration.

6. A vehicle control system as claimed in claim 5, wherein the controller is configured to prevent the value of the driver behavior index changing in dependence on the value of longitudinal acceleration when the value of lateral acceleration exceeds a prescribed value.

7. A vehicle control system as claimed in claim 2, wherein the controller is configured to over-ride stopping of the motor vehicle engine when a difference between the second value and the value of the driver behavior index is less than a prescribed value.

8. A vehicle control system as claimed in claim 1, wherein the controller is configured to change the value of the driver behavior index in dependence on one of a value of driver-demanded brake pressure and a value of driver-demanded brake torque.

9. A vehicle control system as claimed in claim 8, wherein the controller is configured to change the value of the driver behavior index towards a first value when the driver displays the first driving style and to change the value of the driver behavior index towards a second value when the driver displays the second driving style and configured to change the value of the driver behavior index towards the first value when the value of said one of driver demanded brake pressure and driver demanded brake torque is below a prescribed value.

10. A vehicle control system as claimed in claim 1, wherein the controller is configured to change the value of the driver behavior index in dependence on at least one of a brake pedal pressure, a brake pedal position, a rate of change of brake pedal pressure, a rate of change of brake pedal position, an accelerator pedal position, a rate of change of accelerator pedal position, activation of an accelerator pedal kick-down detector, a speed of the motor vehicle, a selected gear of a transmission of the motor vehicle, and a state of a performance mode selector.

11. A vehicle control system as claimed in claim 1, wherein the controller is configured to latch the motor vehicle engine in an on condition in dependence on the driving style of the driver.

12. A vehicle control system as claimed in claim 1, wherein the controller is configured to determine whether the current driving style of the driver corresponds to the first driving style or the second driving style in dependence on a value over time of at least one of:
(a) a speed of rotation of the motor vehicle engine;
(b) a gear ratio between the motor vehicle engine and one or more wheels of the motor vehicle; and
(c) a speed of at least one portion of a driveline of the motor vehicle.

13. A vehicle control system as claimed in claim 1, wherein the first driving style corresponds to an economy-oriented driving style and the second driving style corresponds to a performance-oriented driving style.

14. A vehicle control system as claimed in claim 1, wherein a period of time before the value of the driver behavior index decreases to the value that corresponds to the first driving style and not the second driving style is variable, depending on the value of the driver behavior index before it is determined that the motor vehicle engine is not required to provide torque to drive the motor vehicle.

15. A vehicle comprising:
an engine; and
a controller that is configured to:
implement a start/stop functionality to automatically stop the engine;
monitor one or more parameters associated with the vehicle during a drive cycle;
determine a value of a driver behavior index based on a value of the one or more parameters over time during the drive cycle;
determine whether a current driving style of a driver corresponds to a first driving style or a second driving style in dependence on the value of the driver behavior index;
wherein the value of the driver behavior index is a value from a range of values, wherein values at a first end of the range are assigned to the first driving style and values at a second end of the range are assigned to the second driving style;
determine whether the engine is not required to provide torque to drive the vehicle;
over-ride implementing the start/stop functionality to prevent stopping the engine when it is determined that the engine is not required to provide torque to drive the vehicle and the value of the driver behavior index corresponds to the second driving style;
while over-riding implementing the start/stop functionality to prevent stopping the engine, decrease a current value of the driver behavior index to a value toward the first end of the range compared to the current value;
wherein when it is determined that the engine is not required to provide torque to drive the vehicle and the value of the driver behavior index corresponds to the second driving style, the controller is configured to freeze the value of the driver behavior index for a prescribed amount of time before decreasing the value of the driver behavior index while it is determined that the engine is not required to provide torque to drive the vehicle;

only implement the start/stop functionality to stop the engine when the controller determines that the value of the driver behavior index corresponds to the first driving style and the engine is not required to provide torque to drive the vehicle; and when the value of the driver behavior index has changed to correspond to the first driving style, automatically re-implement the start/stop functionality.

16. A vehicle as claimed in claim 15, wherein the controller is configured to provide feedback to the driver in dependence on an outcome of the determination by the controller whether the driving style corresponds to the first driving style or the second driving style.

17. A vehicle as claimed in claim 16, wherein the controller is configured to provide feedback by at least one of a visual indicator, an audible indicator and haptic feedback.

18. A vehicle as claimed in claim 15, wherein the controller is configured to provide feedback to the driver as to whether stopping of the engine is being over-ridden due to the driving style of the driver.

19. A method of controlling a motor vehicle including a start/stop functionality, the method comprising:
monitoring a value over time of one or more parameters associated with the motor vehicle during a drive cycle;
determining a value of a driver behavior index based on the value of the one or more parameters over time during the drive cycle;
determining that a current driving style of a driver corresponds to a second driving style responsive to the value of the driver behavior index;
wherein the value of the driver behavior index is a value from a range of values, wherein values at a first end of the range are assigned to a first driving style and values at a second end of the range are assigned to the second driving style;
determining that a motor vehicle engine is not required to provide torque to drive the motor vehicle;
over-riding implementing the start/stop functionality to prevent stopping the motor vehicle engine when it is determined that the motor vehicle engine is not required to provide torque to drive the motor vehicle and the value of the driver behavior index corresponds to the second driving style;
while over-riding implementing the start/stop functionality to prevent stopping the associated motor vehicle engine, decreasing a current value of the driver behavior index to a value towards the first end of the range compared to the current value;
when the motor vehicle engine is not required to provide torque to drive the motor vehicle and the value of the driver behavior index corresponds to the second driving style, freezing the value of the driver behavior index for a prescribed amount of time before decreasing the value of the driver behavior index while it is determined that the motor vehicle engine is not required to provide torque to drive the motor vehicle;
only implementing the start/stop functionality to stop the associated motor vehicle engine when the value of the driver behavior index corresponds to the first driving style and the motor vehicle engine is not required to provide torque to drive the motor vehicle; and
when the value of the driver behavior index has changed to correspond to the first driving style, automatically re-implementing the start/stop functionality.

* * * * *